(12) United States Patent
Papakostas et al.

(10) Patent No.: US 12,120,004 B2
(45) Date of Patent: *Oct. 15, 2024

(54) METHODS AND APPARATUS TO DETERMINE MAIN PAGES FROM NETWORK TRAFFIC

(71) Applicant: The Nielsen Company (US), LLC, New York, NY (US)

(72) Inventors: Achilleas Papakostas, Dallas, TX (US); Travis Berthelot, Lewisville, TX (US); Andrey Shapovalov, Dallas, TX (US); Jaimin Patel, Dallas, TX (US); Brendan Phillips, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,900

(22) Filed: Feb. 9, 2023

(65) Prior Publication Data

US 2023/0188437 A1 Jun. 15, 2023

Related U.S. Application Data

(63) Continuation of application No. 17/364,399, filed on Jun. 30, 2021, now Pat. No. 11,595,275.

(51) Int. Cl.
*G06F 15/173* (2006.01)
*G06F 16/955* (2019.01)
(Continued)

(52) U.S. Cl.
CPC .......... *H04L 43/04* (2013.01); *G06F 16/9566* (2019.01); *H04L 43/028* (2013.01); *H04L 63/0272* (2013.01)

(58) Field of Classification Search
None
See application file for complete search history.

(56) References Cited

U.S. PATENT DOCUMENTS

| 5,870,550 A | 2/1999 | Wesinger, Jr. et al. |
| 6,175,838 B1 | 1/2001 | Papierniak et al. |

(Continued)

FOREIGN PATENT DOCUMENTS

| CN | 103677505 B | 12/2017 |
| CN | 105160006 B | 1/2019 |

(Continued)

OTHER PUBLICATIONS

United States Patent and Trademark Office, "Non-Final Office Action," in connection with U.S. Appl. No. 17/364,399, issued Apr. 14, 2022, 9 pages.

(Continued)

*Primary Examiner* — Phuoc H Nguyen

(57) ABSTRACT

Methods and apparatus to determine main pages from network traffic are disclosed. A disclosed example non-transitory computer readable medium includes instructions which, when executed, cause at least one processor to determine patterns of uniform resource identifiers (URIs) with corresponding main pages, parse data from network traffic, identify at least one of the main pages from the data based on the patterns, and provide the identified at least one of the main pages for crediting thereof.

25 Claims, 11 Drawing Sheets

(51) Int. Cl.
  *H04L 9/40* (2022.01)
  *H04L 43/028* (2022.01)
  *H04L 43/04* (2022.01)

(56) References Cited

U.S. PATENT DOCUMENTS

| | | | |
|---|---|---|---|
| 6,178,439 | B1 | 1/2001 | Feit |
| 7,349,892 | B1 | 3/2008 | Virdy |
| 8,661,111 | B1* | 2/2014 | Lauckhart ............ G06Q 30/02 709/224 |
| 8,799,643 | B2* | 8/2014 | Zhou ..................... G06Q 30/02 713/153 |
| 9,301,173 | B2 | 3/2016 | Papakostas |
| 9,319,292 | B2 | 4/2016 | Wyatt et al. |
| 9,552,334 | B1 | 1/2017 | Meisels et al. |
| 10,375,194 | B2 | 8/2019 | Cimino et al. |
| 10,721,299 | B2 | 7/2020 | Anadon et al. |
| 10,778,702 | B1 | 9/2020 | Huang et al. |
| 11,070,438 | B1 | 7/2021 | Nayak et al. |
| 11,165,877 | B2 | 11/2021 | Papakostas et al. |
| 2003/0163370 | A1 | 8/2003 | Chen et al. |
| 2005/0188215 | A1* | 8/2005 | Shulman ............ H04L 63/1416 713/188 |
| 2006/0212792 | A1 | 9/2006 | White et al. |
| 2008/0262991 | A1* | 10/2008 | Kapoor .................. H04L 63/14 706/20 |
| 2009/0164629 | A1 | 6/2009 | Klein et al. |
| 2014/0280896 | A1 | 9/2014 | Papakostas et al. |
| 2014/0372873 | A1 | 12/2014 | Leung et al. |
| 2016/0232538 | A1* | 8/2016 | Papakostas ............. H04L 67/02 |
| 2017/0364949 | A1* | 12/2017 | Vandusen ............. G06F 16/957 |
| 2023/0006897 | A1* | 1/2023 | Papakostas ........... H04L 43/062 |
| 2023/0216935 | A1 | 7/2023 | Viswambharan |

FOREIGN PATENT DOCUMENTS

| | | |
|---|---|---|
| CN | 111159514 A | 5/2020 |
| JP | 2020197929 A | 12/2020 |
| WO | 2014143969 A2 | 9/2014 |

OTHER PUBLICATIONS

United States Patent and Trademark Office, "Notice of Allowance and Fee(s) Due," in connection with U.S. Appl. No. 17/364,399, issued Oct. 27, 2022, 8 pages.

Kayce Basques, "View page resources", Chrome. Developers, Apr. 13, 2015, 13 Pages.

United States Patent and Trademark Office, "Final Office Action," issued in connection with U.S. Appl. No. 17/876,276, dated Sep. 14, 2023, 24 pages.

United States Patent and Trademark Office, "Non-Final Office Action," issued in connection with U.S. Appl. No. 17/876,276, dated Feb. 2, 2023, 23 pages.

United States Patent and Trademark Office, "Notice of Allowance," issued in connection with U.S. Appl. No. 17/876,276, dated Jan. 29, 2024, 19 pages.

\* cited by examiner

| HTTPs Main Get URI Tested | Total Attempts | Total in EventLog | Match Value |
|---|---|---|---|
| https://www.google.com | 1 | 3 | 4/3 = 1.3333334 |
| https://google.com.hk | 1 | 1 | ⅓ = 0.33333334 |
| https://www.google.de | 1 | 3 | ⅙ = 0.8333333 |
| https://www.google.fr | 1 | 2 | ¼ = 0.5 |
| https://www.google.ru | 1 | 1 | 2/4 = 0.5 |
| https://rakuten.co.asia | 1 | 6 | ⅜ = 0.375 |
| https://www.accuweather.com | 1 | 1 | 10/5 = 2.0 |
| https://www.adobe.com | 1 | 3 | 29/20 = 1.45 |
| https://www.adp.com | 1 | 2 | ⅓ = 0.33333334 |

FIG. 6

| Timestamp | url | status | size_response |
|---|---|---|---|
| 2019-10-24 17:14:26 +0530 | | | 100840 |
| 2019-10-24 17:14:26 +0530 | CONNECT fonts.apple.com:443 HTTP/1.1 | 200 | 40145049 |
| 2019-10-24 17:14:26 +0530 | CONNECT www.zillow.com:443 HTTP/1.1 | 200 | 24494475 |
| 2019-10-24 17:14:26 +0530 | CONNECT sb.scorecardresearch.com:443 HTTP/1.1 | 200 | 22434045 |
| 2019-10-24 17:14:26 +0530 | CONNECT c.zillowstatic.com:443 HTTP/1.1 | 200 | 23177267 |
| 2019-10-24 17:14:26 +0530 | CONNECT smetrics.google.com:443 HTTP/1.1 | 200 | 1715259 |
| 2019-10-24 17:14:26 +0530 | CONNECT fonts.gstatic.com:443 HTTP/1.1 | 200 | 690590 |
| 2019-10-24 17:14:26 +0530 | CONNECT www.zillowstatic.com:443 HTTP/1.1 | 200 | 24141338 |
| 2019-10-24 17:14:26 +0530 | CONNECT www.zillowstatic.com:443 HTTP/1.1 | 200 | 801458 |
| 2019-10-24 17:14:26 +0530 | CONNECT e.xg-api.com:443 HTTP/1.1 | 200 | 83347771 |
| 2019-10-24 17:14:27 +0530 | CONNECT e.xg-api.com:443 HTTP/1.1 | 200 | 109686702 |
| 2019-10-24 17:14:27 +0530 | CONNECT pt.ispot.tv:443 HTTP/1.1 | 200 | 219613908 |
| 2019-10-24 17:14:27 +0530 | CONNECT www.zillow.com:443 HTTP/1.1 | 200 | 203867776 |
| 2019-10-24 17:14:27 +0530 | CONNECT static.ads-twitter.com:443 HTTP/1.1 | 200 | 22017208 |
| 2019-10-24 17:14:28 +0530 | CONNECT resources.xgillon.com:443 HTTP/1.1 | 200 | 358238 |
| 2019-10-24 17:14:28 +0530 | CONNECT i.trivialfusion.com:443 HTTP/1.1 | 200 | 40337664 |
| 2019-10-24 17:14:28 +0530 | CONNECT usermatch.krxd.net:443 HTTP/1.1 | 200 | 698539671 |
| 2019-10-24 17:14:28 +0530 | CONNECT beacon.krxd.net:443 HTTP/1.1 | 200 | 70220851 |
| 2019-10-24 17:14:28 +0530 | CONNECT t.co:443 HTTP/1.1 | 200 | 218865683 |
| 2019-10-24 17:14:28 +0530 | CONNECT analytics.twitter.com:443 HTTP/1.1 | 200 | 21632340 |
| 2019-10-24 17:14:28 +0530 | CONNECT 479x202.fls.doubleclick.net:443 HTTP/1.1 | 200 | 217763159 |

FIG. 7

METHODS AND APPARATUS TO DETERMINE MAIN PAGES FROM NETWORK TRAFFIC

RELATED APPLICATION

This patent arises from a continuation of U.S. patent application Ser. No. 17/364,399, which was filed on Jun. 30, 2021, and issued as U.S. Pat. No. 11,595,275. U.S. patent application Ser. No. 17/364,399 is hereby incorporated herein by reference in its entirety. Priority to U.S. patent application Ser. No. 17/364,399 is hereby claimed.

FIELD OF THE DISCLOSURE

This disclosure relates generally to data collection and, more particularly, to methods and apparatus to determine main pages from network traffic.

BACKGROUND

Web content can be delivered to and presented by a wide variety of content presentation devices such as desktop computers, laptop computers, tablet computers, personal digital assistants, smartphones, etc. Because a significant portion of web content is presented to such devices, monitoring of web content can provide valuable information to advertisers, content providers, and the like.

BRIEF DESCRIPTION OF THE DRAWINGS

FIG. 6 illustrates an example analysis that can be implemented in examples disclosed herein.

FIG. 7 illustrates another example analysis that can be implemented in examples disclosed herein.

The figures are not to scale. In general, the same reference numbers will be used throughout the drawing(s) and accompanying written description to refer to the same or like parts.

Figure 1:
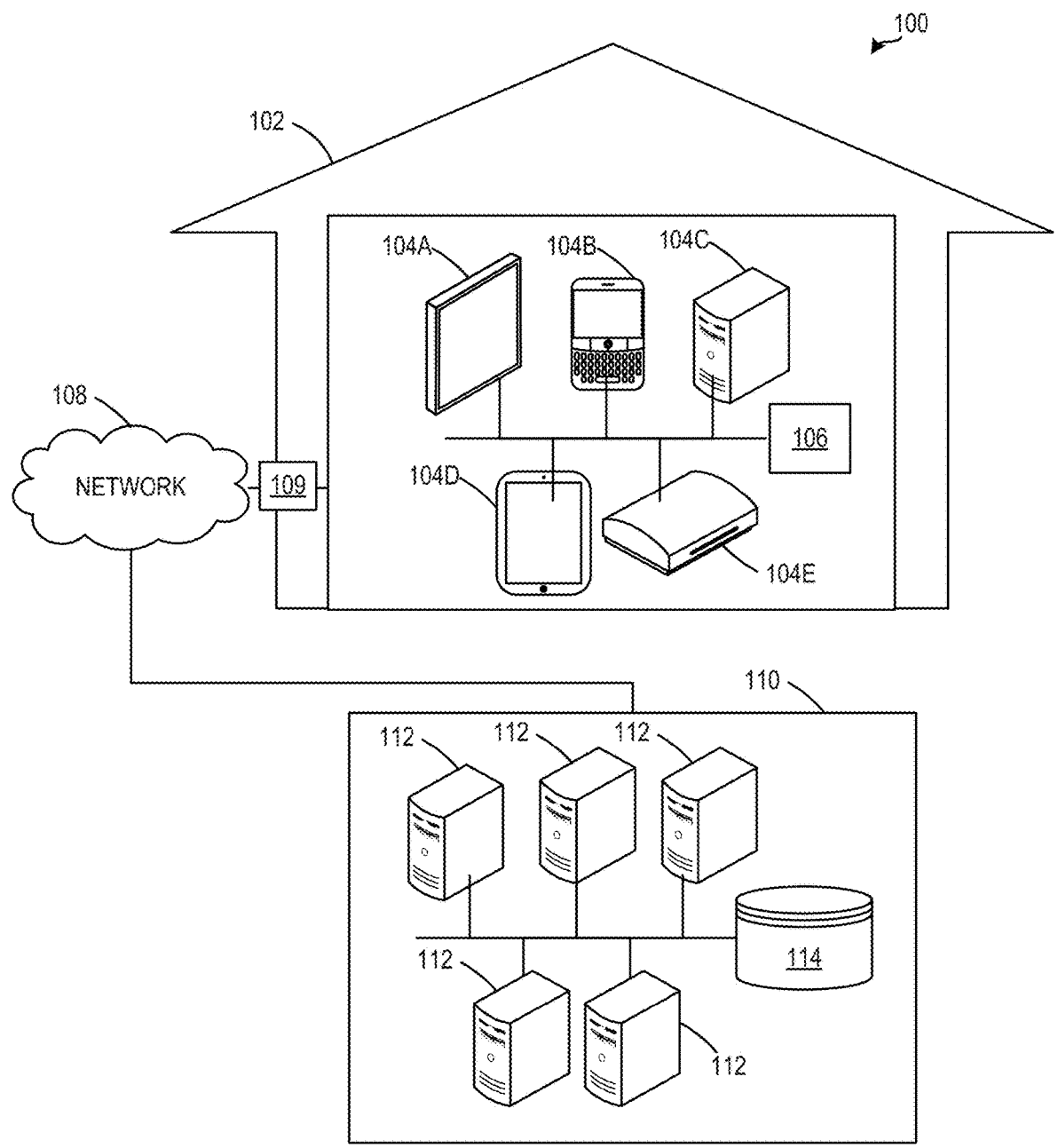
FIG. 1 illustrates an example environment in which examples disclosed herein can be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus to determine main pages from network traffic are disclosed. Web content can be delivered to and presented by a wide variety of content presentation devices. This web content can be analyzed to determine web activity. Some known implementations include monitoring web content of a custom browser. However, data associated with the custom browser is heavily skewed towards a subset of persons willing to use the custom browser. Similarly, external monitoring devices can correspond to data skewed towards those willing to use the external monitoring devices.

Examples disclosed herein enable accurate and computationally efficient determination of main pages (e.g., main websites, main web pages, primary pages, etc.) from extracted and/or parsed uniform resource identifiers (URIs) and/or uniform resource locators (URLs) that are captured in network traffic (e.g., web traffic). Examples disclosed herein also enable space-efficient storage of data and use of relatively less bandwidth than known implementations. Even further, by analyzing network traffic, examples disclosed herein can accurately obtain data without the need for special permission from users.

Examples disclosed herein utilize trained data for subsequent identification of patterns in network traffic for determination/characterization of browsing activity, including access of main pages. For example, a pattern of a main page is trained based on URI sets (e.g., URI lists) encountered during a training phase. The pattern can be generated, maintained and stored on a server, for example. Subsequent to the training phase, in an implementation phase, the pattern is utilized to identify access of the main page by a media device, for example. In particular, the media device can identify the pattern based on comparing URI sets/lists from data packets (e.g., parsed data packets) in network traffic (e.g., data packets obtained via a virtual private network (VPN)) to the aforementioned pattern. As a result, the accessed main page can be forwarded for crediting and/or post-processing. In some examples, the media device employs a web traffic processor (WTFP) to identify the pattern based on the URI sets.

In some examples, the pattern is identified based on a number of occurrences of URIs in the URI sets. In some examples, the URIs and/or the URI sets are removed from a storage (e.g., a data storage) once a main page is determined, thereby saving storage space. In some examples, a ratio of attempts of requested URIs to a total number of occurrences of the request URI in an event log defines the pattern and/or is utilized to identify the pattern. In some examples, the pattern includes, is defined by and/or is associated with lists of URIs associated with a main page. In some such examples, collected and/or obtained URIs are compared to the lists. In some examples, the media device provides and/or forwards the main page to the aforementioned server, thereby reducing an amount of data being transmitted and received therebetween, in addition to reducing an amount of data stored.

As used herein, the term "pattern" refers to a pattern associated with URIs (e.g., a list or set of URIs) corresponding to a main website or a main page. As used herein, the terms "main URI," "main URL," "main web page" and "main page" refer to a primary page with sub-pages or URIs that are associated therewith. Accordingly, the terms "main URI," "main URL," "main web page" and "main page" can refer to primary websites that call, refer to and/or direct traffic when accessed via a browser or other application. Moreover, the terms "main URI," "main URL," "main web page" and "main page" can refer to pages that are hierarchically above URIs, including intermediate pages/URIs or top level pages/URIs.

FIG. 1 illustrates an example environment 100 in which examples disclosed herein can be implemented. The example environment 100 supports monitoring of media presented at one or more monitored sites, such as an example monitored site 102 illustrated in FIG. 1, and includes example media devices (e.g., a media presentation devices) 104. Although the example of FIG. 1 illustrates one of the monitored site 102 and five of the media devices 104, examples disclosed herein can be implemented in an environment 100 supporting any number of monitored sites 102 having any number of the media devices 104. Further, examples disclosed herein can be implemented in any appropriate network configuration and/or topology.

The environment 100 of the illustrated example includes an example metering controller 106 to monitor media presented by the media devices 104. In the illustrated example, the media monitored by the metering controller 106 can correspond to any type of media presentable by the media devices 104. For example, monitored media can correspond to media content, such as television programs, radio programs, movies, Internet video, video-on-demand, etc., as well as commercials, advertisements, etc. In this example, the metering controller 106 determines metering data that may identify and/or be used to identify media presented by the media devices 104 (and, thus, infer media exposure) at the monitored site 102. The metering controller 106 then stores and reports this metering data via an example network 108 to an example data processing facility 110. In this example, the network 108 is communicatively coupled to a VPN 109.

In this example, the data processing facility 110 stores, maintains and generates patterns associated with the metering data and performs any appropriate post-processing of the metering data to, for example, determine audience ratings information, identify targeted advertising to be provided to the monitored site 102, etc. In this example, the data processing facility 110 can correspond to any type(s) and/or number of external facilities, cloud-based data centers, or in-house facilities and includes example servers 112 and an example central database 114. In some examples, the post-processing of the metering data is performed on one or more of the servers 112. In some examples, the central database 114 can store the metering data from the metering controller 106 and/or processed metering data from the servers 112. In the illustrated example, the network 108 can correspond to any type(s) and/or number of wired and/or wireless data networks, or any combination thereof.

In the illustrated example, each of the media devices 104 monitored by the metering controller 106 can correspond to any type of audio, video and/or multimedia presentation device capable of presenting media audibly and/or visually. For example, each of the media devices 104 can correspond to a multimedia computer system, a personal digital assistant, a cellular/mobile smartphone, a radio, a tablet computer, etc.

In examples disclosed herein, the metering controller 106 can be implemented by or otherwise included in each of the media devices 104. This example implementation can be especially useful in scenarios in which a media monitoring application is executed on the media devices 104, but the media devices 104 prevents (e.g., via digital rights management or other techniques) third-party applications, such as the media monitoring application, from accessing protected media data stored on the media device 104.

As will be discussed in greater detail below in connection with FIGS. 2-11, examples disclosed train web access/browser data (e.g., at the servers 112) to generate patterns associated with main URIs (e.g., main web pages, primary web pages, etc.). In turn, the patterns are utilized to identify access of the main URIs from data in network traffic (e.g., web traffic, internet traffic, proxy traffic, parsed network traffic, etc.). Examples disclosed herein can be applied to URIs, URLs, or any other type of network/internet content or data. Further, examples disclosed herein can be applied to any appropriate type of web traffic including, but not limited to, HyperText Transfer Protocol (HTTP) data, HyperText Transfer Protocol Secure (HTTPS) data, etc.

While the VPN 109 is shown in this example, in some examples a proxy (e.g., a proxy server, a proxy device, etc.) can be implemented instead. In some such examples, proxy traffic can be recorded and analyzed for use with examples disclosed herein. In some examples, the VPN 109 can be implemented on at least one of the media devices 104.

Figure 2:
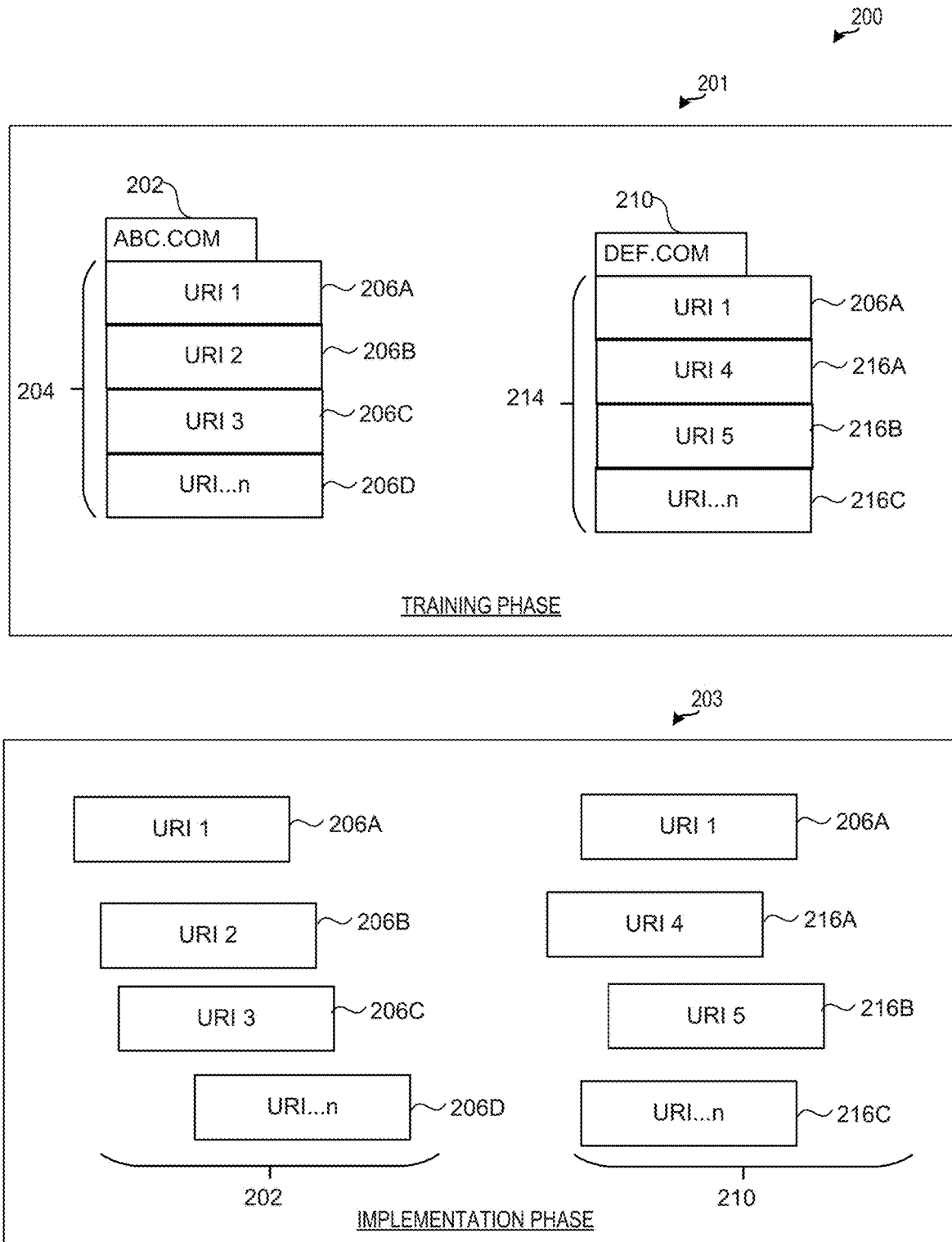
FIG. 2 illustrates an overview of an example process flow in accordance with teachings of this disclosure.

FIG. 2 illustrates an overview of an example process flow 200 in accordance with teachings of this disclosure. In the illustrated example, a training phase 201 and an implementation phase 203 are shown. According to examples disclosed herein, a main page 202 is associated with a set 204 of corresponding URIs 206 (hereinafter 206A, 206B, 206C, 206D, etc.). Likewise, a main page 210 is associated with a set 214 of URIs including the URI 206A and URIs 216 (hereinafter 216A, 216B, 216C, etc.).

To determine and/or generate patterns associated with the main pages 202, 210, the sets 204, 214, respectively, are identified and/or characterized. For example, the patterns are determined by identifying URIs typically or commonly present when a corresponding one of the main pages 202, 210 is loaded and/or accessed. In some examples, a number of occurrences of some URIs and/or related URIs define the pattern. Additionally or alternatively, a timing and delay between when the URIs respond define the pattern. In some examples, artifacts, files and/or embedded data at least partially define the pattern.

To determine whether traffic data and/or browsing data corresponds to at least one of the main pages, the implementation phase 203 is executed (e.g., without accessing browser data). As a result, access of a main page can be identified based on received, identified and/or monitored URIs. In the example of FIG. 2, the URIs 206A, 206B, 206C, 206D are identified or observed at similar times (e.g., within a requisite time period, within a defined time interval, etc.) and, thus, the main page 202 is determined to be accessed by a user of the media device 104. Similarly, the URIs 206A, 216A, 216B, 216C are also identified, thereby indicating access of the main page 210 in the implementation phase 203. In this example, the media device 104 performs the implementation phase 203 based on patterns received from the server 112. As mentioned above, the patterns are defined and stored at the server 112, for example. Further, the server 112 can maintain and update the patterns. In this example, the server 112 transmits and/or provides the patterns to the media device 104 at regular intervals or when a condition is met (e.g., at least one pattern is generated, the media device 104 requests patterns, the media device 104 cannot determine a main page based on URIs that the media device 104 has encountered, the media device 104 is unable to identify a pattern based on previously provided patterns, etc.).

Figure 3:
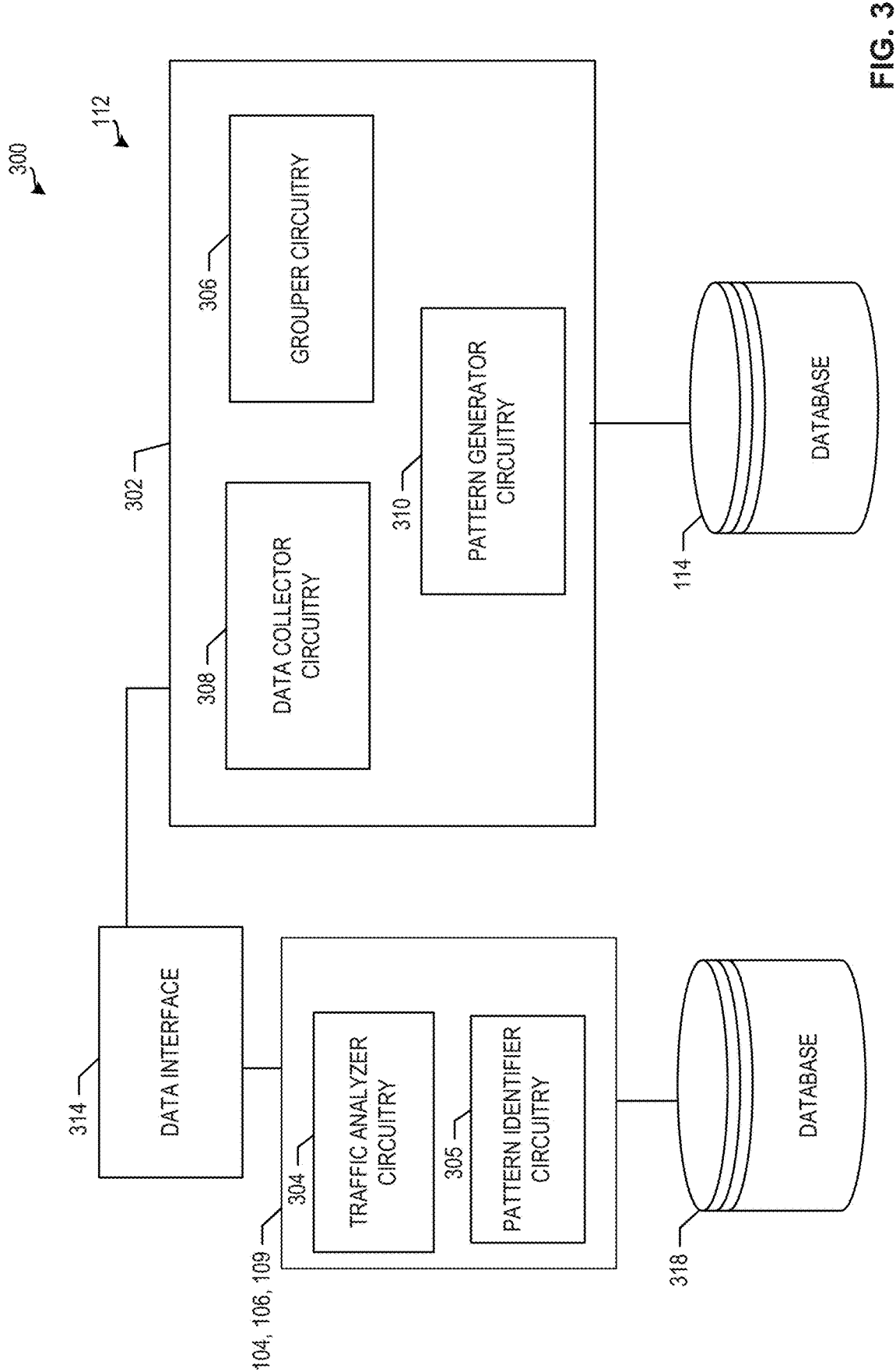
FIG. 3 is a schematic overview of an example browsing analysis system in accordance with teachings of this disclosure.

FIG. 3 is a schematic overview of an example browsing analysis system 300 in accordance with teachings of this disclosure. The browsing analysis system 300 of the illustrated example includes a pattern trainer 302, which can be implemented in the servers 112 described above in connection with FIG. 1. The example pattern trainer 302 trains data for use with traffic analyzer circuitry 304 and pattern identifier circuitry 305, both of which are implemented in the media device 104, the metering controller 106 and/or the VPN 109 of FIG. 1. In turn, the example pattern trainer 302 includes example grouper circuitry 306, example data collector circuitry 308 and example pattern generator circuitry 310. The example browsing analysis system 300 also includes a data interface 314 that communicatively couples the pattern trainer 302 and the pattern identifier circuitry 305. Further, in this example, the media device 104 and/or the pattern identifier circuitry 305 is communicatively coupled to a database 318 while the pattern trainer 302 is communicatively coupled to the database 114 shown in FIG. 1. The example data and/or network topology is on only an example implementation and any appropriate topology can be implemented instead.

In the illustrated example, the data collector circuitry 308, which can be implemented on the servers 112 and/or the media device 104, collects data (e.g., pattern data, URI pattern data, etc.) for use with training data associated with main pages for later identification and crediting thereof. In this example, the data collector circuitry 308 collects URI/URL network traffic data via the data interface 314 and/or the network 108 so that patterns associated with the main pages can be generated for subsequent identification by the media device 104. In some examples, the data collector circuitry 308 collects this data as parsed data packets, which may be provided from the VPN network 109. In some examples, the data collector circuitry 308 collects the data through launching the main pages on the media device 104. Additionally or alternatively, the data is obtained by the servers 112 accessing the main pages.

The pattern generator circuitry 310 of the illustrated example is implemented to generate patterns associated with main pages during the training phase. In particular, the example pattern generator circuitry 310 determines and/or identifies the patterns of URIs (e.g., URIs accessed, URIs referenced, URIs in a list, etc.) associated with the main pages to generate trained data. In this example, the pattern generator circuitry 310 generates the trained data as URI sets (e.g., lists of URI obtained and/or identified) encountered in network traffic as the main pages are accessed. In some examples, a pattern is generated by repeated and/or multiple launches (e.g., offline launches, online launches) and/or refreshes of a corresponding main page. Additionally or alternatively, event logs (e.g., URI/URL request/access logs, fetch data, etc.) are utilized in determining the patterns. In some examples, the patterns are generated based on websites viewed by a known panel of users. In some examples, the pattern includes at least one list of URIs and associated attributes of the URIs (e.g., loading, sequence, loading times, a number of URIs, etc.) corresponding to the main page. The pattern, URI lists of the pattern and/or URI data may be stored in the database 114.

The example traffic analyzer circuitry 304 captures URIs and/or associated parameters of the URIs from the network traffic data captured by the media device 104 and/or the VPN 109. In the illustrated example, the traffic analyzer circuitry 304 collects multiple URIs that can be associated with a single main page during a single session (e.g., a session with a corresponding time interval), for example. In this example, the URIs are identified from parsed data packets (e.g., parsed data packets captured by and/or passing through the VPN 109) and compiled into a list (e.g., a list of URIs encountered within a defined time interval).

The example pattern identifier circuitry 305 is implemented to determine the main page based on a known identified pattern (e.g., a previously trained pattern). The pattern identifier circuitry 305 can be implemented in the server 112, the media device 104, the metering controller 106 and/or the VPN 109. In this example, the pattern identifier circuitry 305 is implemented on the media device 104 to identify a main page based on at least one pattern received from the server 112. In this example, multiple patterns and/or data corresponding to the patterns is provided to the media device 104 by the server 112 for identification and crediting of the main page. As a result of identifying access of the main page, the example pattern identifier circuitry 305 outputs relatively compact data pertaining to the identified main page to the server 112, thereby saving bandwidth usage and storage space. For example, the data can include only a main page identification that is computationally efficient to process and/or analyze (e.g., analyze by the server 112) due to containing significantly less data than data representing multiple URIs. In some examples, the pattern identifier circuitry 305 removes URIs, URI lists and/or URI sets from the database 318 in response to identification of the main page, thereby conserving storage space thereof.

In some examples, the grouper circuitry 306 is implemented to group URIs for pattern matching by the example pattern generator circuitry 310. The URIs can be grouped based on time (e.g., session time, time interval, time delay, etc.), device information, session information, browser information (e.g., browser identifiers, etc.) during the training phase. In some examples, the grouper circuitry 306 groups the URIs identified and/or collected in network traffic (e.g., VPN traffic) based on timing during the training phase (e.g., the URIs are collected during a defined time period of the training phase). In other examples, the grouper circuitry 306 is implemented to group URIs for the pattern identifier circuitry 305 during the implementation phase.

While an example manner of implementing the browsing analysis system 300 of FIG. 3 is illustrated in FIG. 3, one or more of the elements, processes and/or devices illustrated in FIG. 3 may be combined, divided, re-arranged, omitted, eliminated and/or implemented in any other way. Further, the example traffic analyzer circuitry 304, the example data collector circuitry 308, the example grouper circuitry 306, the example pattern generator circuitry 310, the example pattern identifier circuitry 305, and/or, more generally, the example browsing analysis system 300 of FIG. 3 may be implemented by hardware, software, firmware and/or any combination of hardware, software and/or firmware. Thus, for example, any of the example traffic analyzer 304, the example data collector 308, the example grouper 306, the example pattern generator 310, the example pattern identifier 305 and/or, more generally, the example browsing analysis system 300 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs). When reading any of the apparatus or system claims of this patent to cover a purely software and/or firmware implementation, at least one of the example the example traffic analyzer circuitry 304, the example pattern identifier circuitry 305, the example data collector circuitry 308, the example grouper circuitry 306, the example pattern generator circuitry 310, and/or the example the example pattern identifier circuitry 305 is/are hereby expressly defined to include a non-transitory computer readable storage device or storage disk such as a memory, a digital versatile disk (DVD), a compact disk (CD), a Blu-ray disk, etc., including the software and/or firmware. Further still, the example browsing analysis system 300 of FIG. 3 may include one or more elements, processes and/or devices in addition to, or instead of, those illustrated in FIG. 4, and/or may include more than one of any or all of the illustrated elements, processes and devices.

Figure 4:
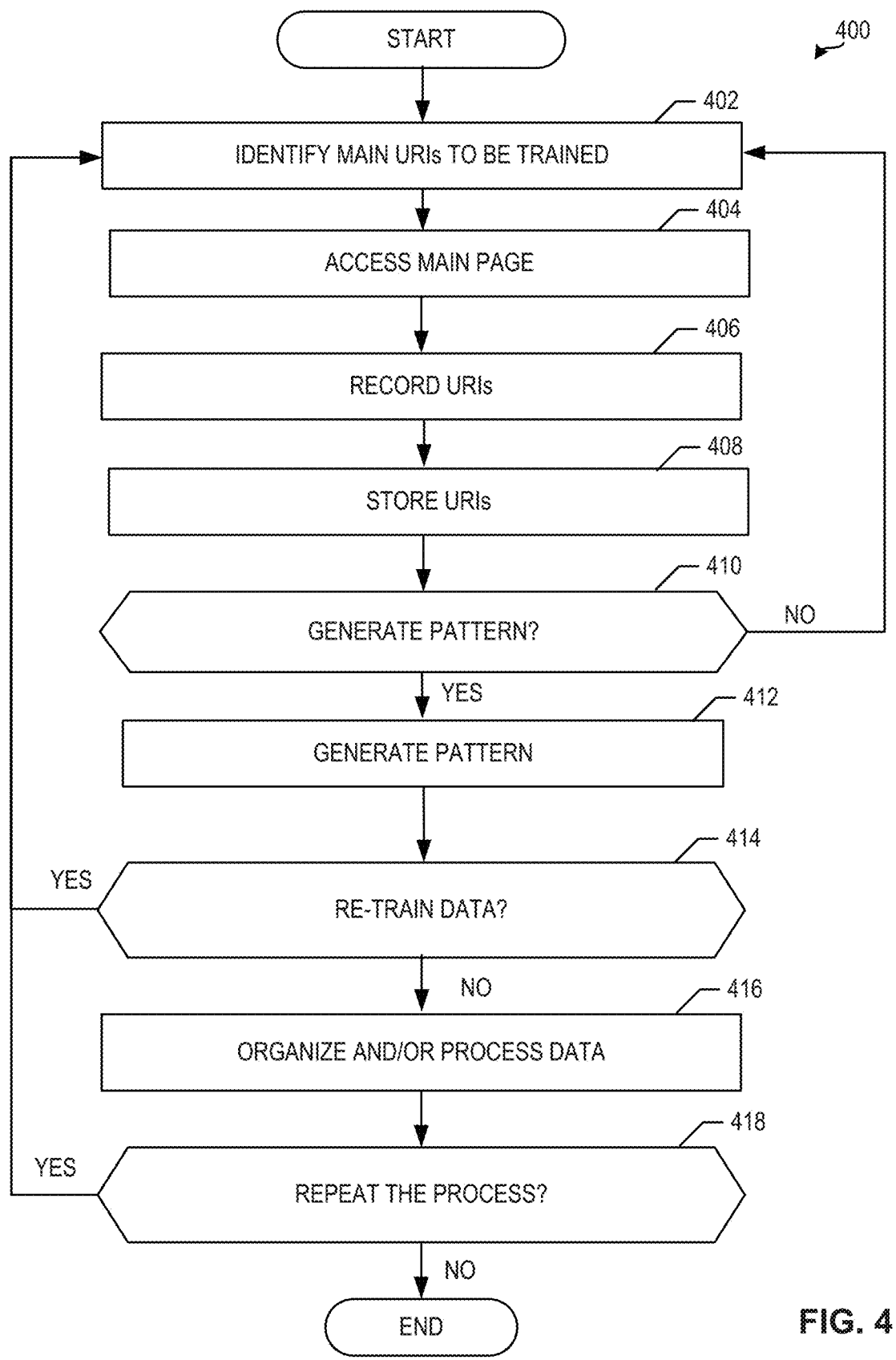
FIG. 4 is a flowchart representative of example machine readable instructions that may be executed by example processor circuitry to implement the example browsing analysis system of FIG. 3.
Figure 5:
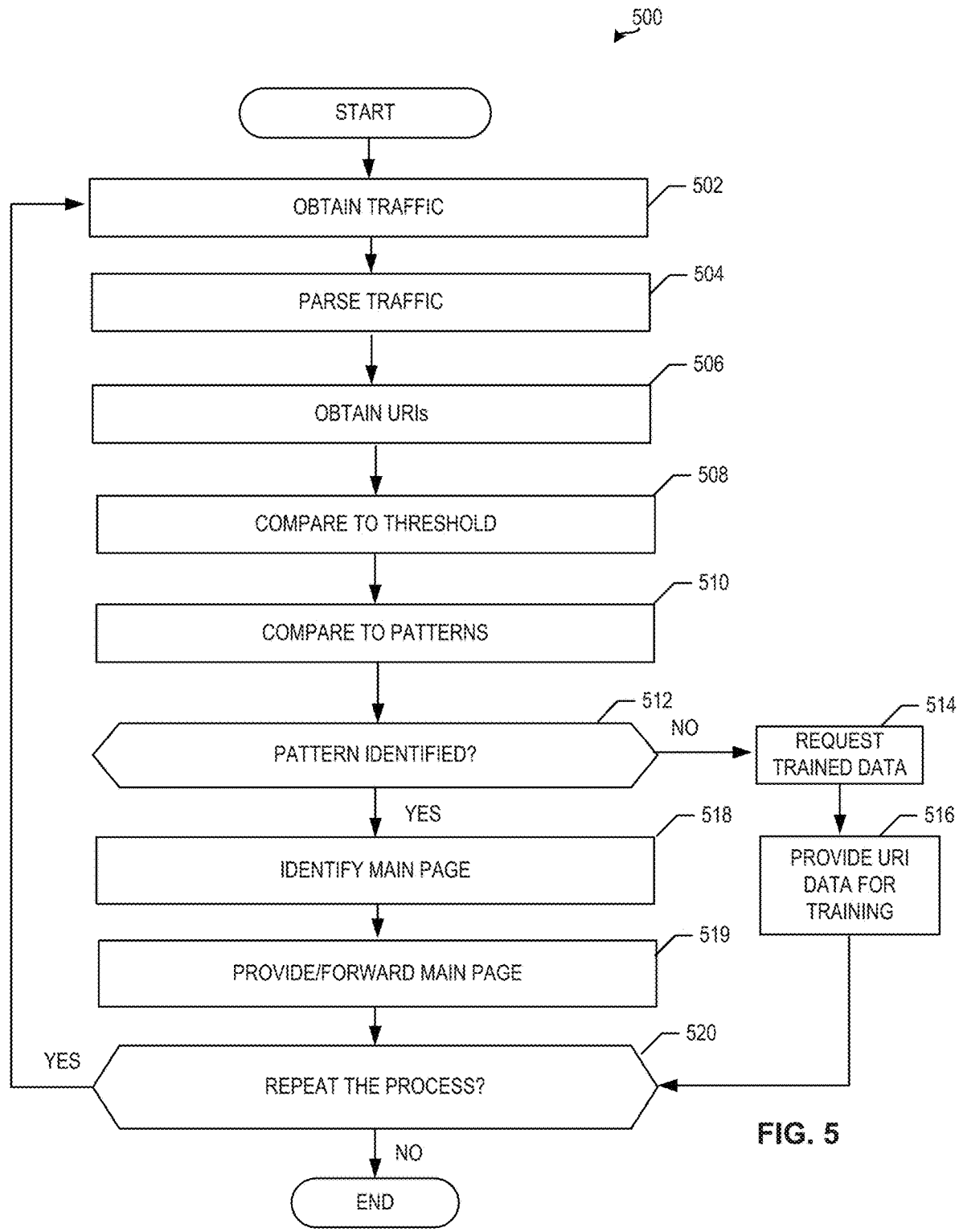
FIG. 5 is a flowchart representative of example machine readable instructions that may be executed by example processor circuitry to implement the example browsing analysis system of FIG. 3.

Flowcharts representative of example hardware logic, machine readable instructions, hardware implemented state machines, and/or any combination thereof for implementing the browsing analysis system 300 of FIG. 3 are shown in FIGS. 4 and 5. The machine readable instructions may be one or more executable programs or portion(s) of an executable program for execution by processor circuitry, such as the processor 812 shown in the example processor platform 800 discussed below in connection with FIG. 8 and/or the example processor circuitry discussed below in connection with FIGS. 9 and/or 10. The program may be embodied in software stored on a non-transitory computer readable storage media such as a CD, a floppy disk, a hard disk-drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4 and 5, many other methods of implementing the example browsing analysis system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the example browsing analysis system 300 of FIG. 3. The example method 400 begins as main page data is to be trained to generate patterns associated with main pages (e.g., main web pages, main pages, main URIs, main URLs, main web sites, top-level pages, etc.). The patterns are to be subsequently used to identify the main pages by the media device 104, for example. In other words, the example method 400 of FIG. 4 illustrates an example training phase.

At block 402, the example data collector circuitry 308 identifies main pages to be trained. In some examples, the main pages include web pages determined from a panel (e.g., web pages known to be accessed by the panel, web pages predicted to be accessed by the panel, etc.). Additionally or alternatively, the main pages include websites deemed to be popular or well-known (e.g., based on traffic, based on polling, etc.).

At block 404, in the illustrated example, the data collector circuitry 308 accesses (e.g., accesses in an off-line session) the main pages. In this example, the data collector circuitry 308 accesses the main pages so that related URIs can be associated with the main pages. Additionally or alternatively, the data collector circuitry 308 causes the media device 104 to access the main pages and, thus, access URIs thereof. For example, a GET URI function and/or a table associated with the GET URI function (e.g., an event log, a table of the URIs accessed with the main pages) can be utilized to identify and characterize the accessed URIs. In particular, the GET URI function can be related to sending events to a central server for processing. In some examples, the URIs and/or information pertaining to the URIs are stored in the database 114.

At block 406, in this example, the data collector circuitry 308 and/or the pattern generator circuitry 310 records URIs associated with the main pages accessed during the training phase. In particular, the URIs are recorded when the main pages are accessed (or as a result of the main pages being accessed). In this example, the URIs are recorded in a table form with corresponding parameters thereof (e.g., an order of loading the URIs, a number of requests versus encountered numbers, loading/access times of the URIs, etc.). In some examples, a ratio is employed between the number of requests and number of encountered URIs (e.g., from a URI log). In some examples, the URIs are obtained from data packets in network traffic. In some examples, network data, such as a forwarding URI is analyzed (e.g., when HTTP data is analyzed). Additionally or alternatively associated URIs are mapped to identifiers to enable faster computational processing.

At block 408, the data collector circuitry 308 and/or the grouper circuitry 306 stores the URIs and/or data associated with the URIs in the database 114. In some examples, the grouper circuitry 306 groups the URIs based on the main pages (e.g., the URIs are organized, grouped and/or bundled together based on their corresponding main URIs/web pages, etc.)

At block 410, the pattern generator circuitry 310 of the illustrated example determines whether to generate a pattern. If the pattern is to be generated (block 410), control of the process proceeds to block 412. Otherwise, the process returns to block 402. This determination may be based on whether the loading of the main pages was successful. Additionally or alternatively, the determination is based on whether repeated/successive reloading the main pages results in consistent URIs and/or URI attributes being accessed (e.g., successive reloads of the main pages yield with a threshold degree of similarity).

At block 412, the pattern generator circuitry 310 generates the pattern. In particular, URI data and/or aspects of the URIs associated with the main pages are trained to define the pattern. In some examples, the data of the URIs associated with the main pages are trained with different conditions (e.g., logged in versus not logged in, etc.), different times of the day, different browsers, etc. In some examples, the pattern corresponds to URI signatures, audio fingerprinting, time-based access/delay of URIs requested (e.g., via the GET URI FUNCTION), sequences of URIs accessed, loading times of URIs and/or the main pages, website requests (e.g., pinging another URI or web page) and/or web panel size/layout information, etc. In some examples, multiple patterns are associated with ones of the main pages. In some examples, the pattern is based on background artifacts and/or objects (e.g., JavaScript, ads, CSS, etc.).

At block 414, it is determined by the data collector circuitry 308 and/or the pattern generator circuitry 310 whether to re-train the data. This determination may be based on whether the pattern(s) associated with the main page has changed. Additionally or alternatively, the determination is based on whether the main pages have yielded consistent pattern(s) and/or changed (e.g., website reconfigurations, etc.). In some examples, the data is retrained if too many main pages are matched. If the data is to be retrained (block 414), the process returns to block 402. Otherwise, the process proceeds to block 416.

At block 416, the grouper circuitry 306 and/or the pattern generator circuitry 310 organizes and/or processes the data associated with the patterns. For example, the data associated with the patterns can be translated and/or converted into data for the media device 104 so that the media device 104 can recognize the patterns and provide bandwidth efficient indications of recognized patterns to the server 112, for example.

At block 418, it is determined whether to repeat the process. If the process is to be repeated (block 418), control of the process returns to block 402. Otherwise, the process ends.

FIG. 5 is a flowchart representative of example machine readable instructions and/or example operations 500 that may be executed and/or instantiated by processor circuitry to implement the example browsing analysis system 300 of FIG. 3. The example method 500 begins as the media device 104 has been provided with trained data from the server 112 for recognizing a main page. In particular, the media device 104 has been provided with a pattern to identify access of the main page.

At block 502, the traffic analyzer circuitry 304 of the illustrated example obtains traffic (e.g., web traffic). In this example, the traffic analyzer circuitry 304 obtains data packets (e.g., HTTP packets) containing URI information and/or references thereto.

At block 504, the traffic analyzer circuitry 304 parses data from the traffic associated the data interface 314. In this example, the traffic analyzer circuitry 304 parses the data from the aforementioned data packets.

At block 506, the traffic analyzer circuitry 304 and/or the pattern identifier circuitry 305 obtains and/or collects URIs. In this example, the URIs are associated with web traffic of the media device 104 and/or the VPN 109 during web browsing activity. In some examples, the URIs are stored in the database 318.

At block 508, in some examples, the traffic analyzer circuitry 304 and/or the pattern identifier circuitry 305 compares URIs accessed by the media device 104 and/or the VPN 109 to a threshold. For example, URIs having a likelihood of being above the threshold are designated to be forwarded to the traffic analyzer circuitry 304 for pattern recognition. Conversely, URIs with a likelihood not exceeding the threshold are eliminated, such as a winners/losers logic in which incomplete URIs and/or URIs with low relevance numbers, thereby reducing an amount of URIs to be analyzed by the example pattern identifier circuitry 305.

At block 510, the pattern identifier circuitry 305 of the illustrated example compares URIs and/or associated URI data of the media device 104 and/or data from the VPN 109 to patterns stored in the database 318. In this example, the patterns include tables of URI data. In some examples, tables of the URIs encountered are compared to tables associated with the patterns. Additionally or alternatively, a likelihood of a match is calculated based on a similarity of the URI data of the media device 104 to the patterns.

At block 512 the example pattern identifier circuitry 305 determines whether a pattern has been identified. This determination may be based on a degree of similarity of the URIs to the pattern (e.g., a 60% match a 70% match, an 80% match, a 90% match, etc.) exceeding a threshold degree of similarity. Additionally different weighting can be applied to different aspects (e.g., a higher weight is applied to URI identification as opposed to a lower weight applied to URI sequence/timing in determining and/or identifying a pattern). In some examples, pattern tables are utilized in the determination. If the pattern has been identified (block 512), control of the process proceeds to block 518. Otherwise, the process proceeds to block 514.

At block 514, in some examples, if the pattern is not identified (block 512), the pattern identifier circuitry 305 requests new and/or additional trained data from the pattern generator circuitry 310 and/or the data collector circuitry 308 of the server 112.

At block 516, in some examples, the pattern identifier circuitry 305 and/or the traffic analyzer circuitry 304 provides URIs and/or data associated with the URIs to the pattern generator circuitry 310 and/or the server 112 so that additional patterns can be generated by the pattern generator circuitry 310 (e.g., in response to not being able to identify a pattern). In some examples, URIs that are not matched are forwarded to the pattern generator circuitry 310. Additionally or alternatively, the URIs can be sent to the pattern generator circuitry 310 for increasing pattern accuracies. In some examples, the URIs are discarded when no pattern can be matched to the URIs.

According to examples disclosed herein, at block 518, the pattern identifier circuitry 305 identifies access of the main page by the media device 104 based on the identified pattern. In this example, the pattern identifier circuitry 305 utilizes parameters (e.g., URI lists, URI timing, URI ordering, embedded files, images, etc.) of the URIs and compares the parameters to the pattern to identify the main page. In some examples, this determination is based on a degree of similarity between the pattern and the URIs parsed from network traffic.

At block 519, the pattern identifier circuitry 305 of the illustrated example provides/forwards the main page to the server 112. In this example, the pattern identifier circuitry 305 outputs the main page to the data collector circuitry 308 so that crediting and post-processing can be performed. Additionally or alternatively, the main page is stored in the database 318. In some examples, the pattern identifier circuitry 305 removes and/or erases the associated URIs from the database 318 once the main page is determined. In some examples, the pattern identifier circuitry 305 is implemented on the server 112 and utilizes event logs to credit the main page. In some examples, post-processing is performed in response to the main page being identified. For example, crediting can be performed on the main page by the server 112 and/or the data collector circuitry 308.

At block 520, it is determined whether to repeat the process. If the process is to be repeated (block 520), control of the process returns to block 502. Otherwise, the process ends. This determination may be based on a level of browsing activity, network activity, URI activity and/or a degree (e.g., a number) of URIs parsed from network traffic.

FIG. 6 illustrates an example analysis that can be implemented in examples disclosed herein. In the illustrated view of FIG. 6, an example table 600 that represents example URI data that can represent patterns and/or be associated with patterns is shown. In this example, main GET URI functions tested are associated with attempts and total numbers of the primary main page in an event log. As a result, ratios of a sum of total attempts and a number of events in an event log over the number of events is calculated to characterize a main page associated with the URI data. Accordingly, these ratios can be used to generate patterns or to identify patterns of URIs associated with the main page.

FIG. 7 illustrates an example analysis that can be implemented in examples disclosed herein. As can be seen in FIG. 7, an example table 700 that represents example URI data that can represent patterns and/or be associated with patterns is shown. According to the illustrated example, time stamps identify when GET URI functions and connections occur. As a result, a response time is calculated. Further, a status (e.g., 301, 200, etc.) of a corresponding URI is shown. Any of the above-described parameters in connection with FIGS. 2-7 can be utilized, alone or in combination, in establishing, identifying or generating a pattern associated with a main page.

Figure 8:
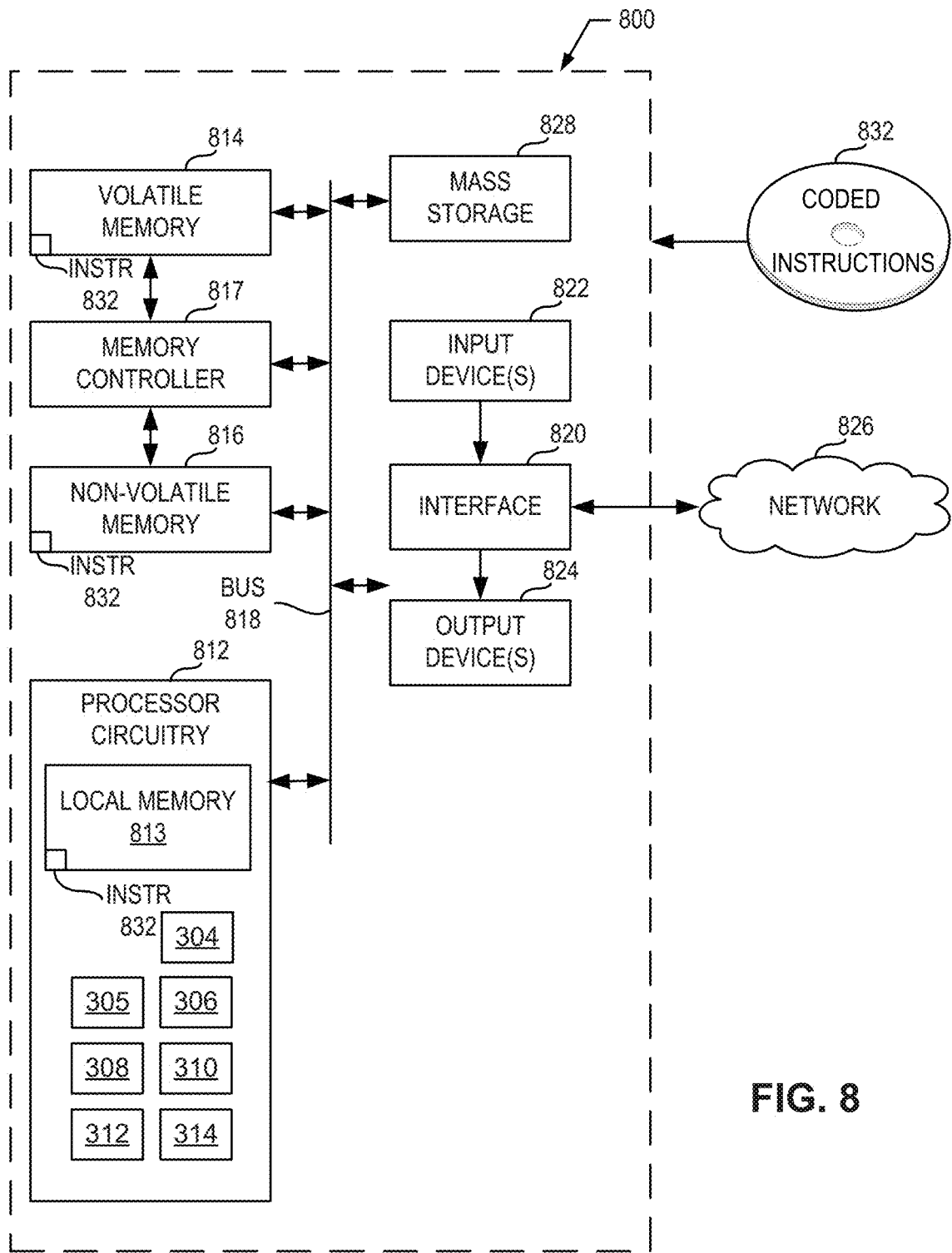
FIG. 8 is a block diagram of an example processing platform including processor circuitry structured to execute the example machine readable instructions of FIGS. 4 and 5 to implement the example browsing analysis system of FIG. 3.

FIG. 8 is a block diagram of an example processor platform 800 structured to execute and/or instantiate the machine readable instructions and/or operations of FIGS. 4 and 5 to implement the browsing analysis system 300 of FIG. 3. The processor platform 800 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, a headset (e.g., an augmented reality (AR) headset, virtual reality (VR) headset, etc.), or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example traffic analyzer circuitry 304, the example data collector circuitry 308, the example pattern identifier circuitry 305, the example grouper circuitry 306, the example pattern generator circuitry 310 and the example pattern identifier circuitry 305.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuitry 820 of the illustrated example, thus, typically includes a graphics driver card, a graphics driver chip, and/or graphics driver processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832 which may be implemented by the machine readable instructions of FIGS. 3 and 4 may be stored in the mass storage device 828, in the volatile memory 814, in the non-volatile memory 816, and/or on a removable non-transitory computer readable storage medium such as a CD or DVD.

Figure 9:
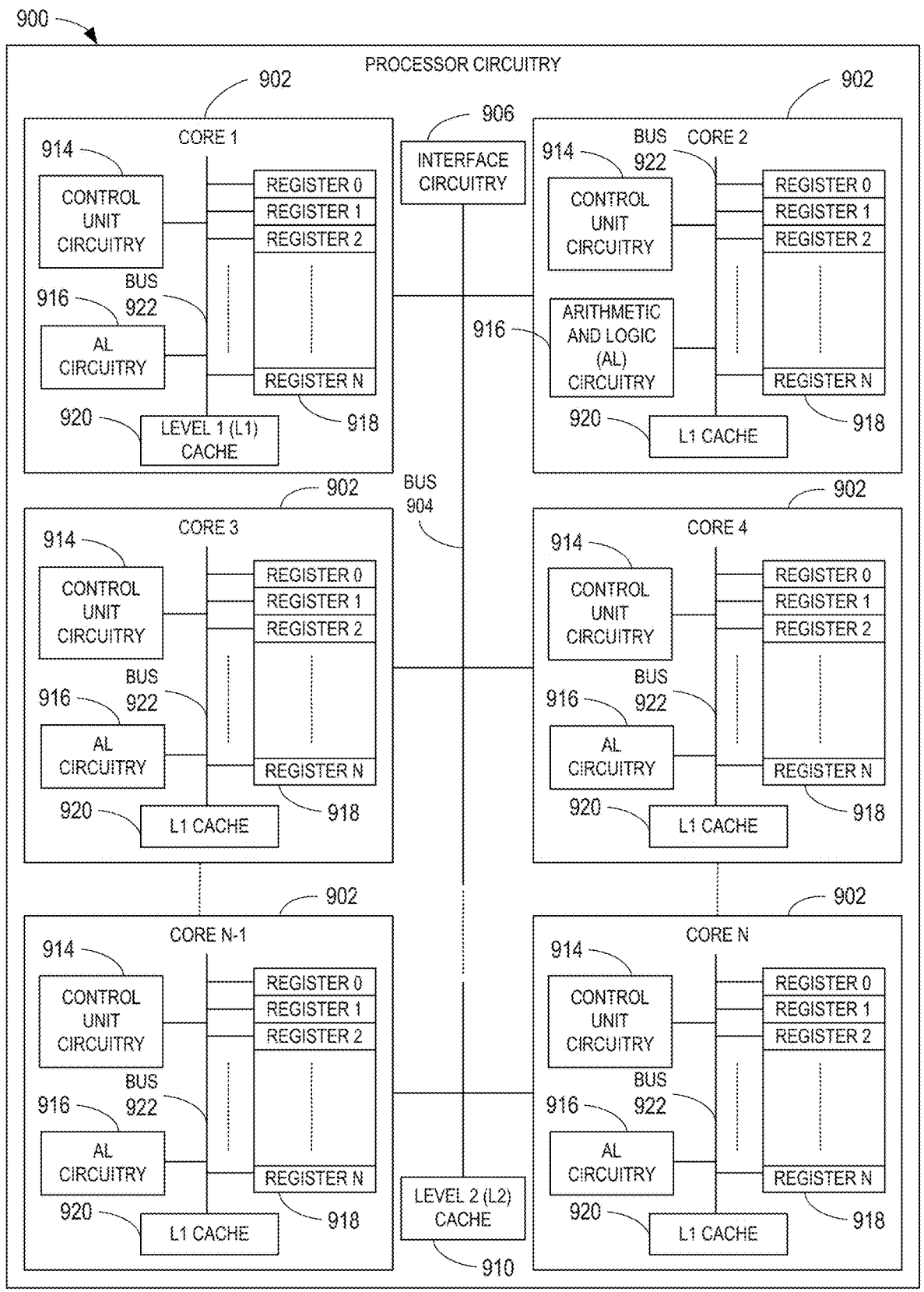
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4 and 5.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 5. Alternatively, the registers 918 may be organized in any other arrangement, format, or structure including distributed throughout the core 902 to shorten access time. The bus 904 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
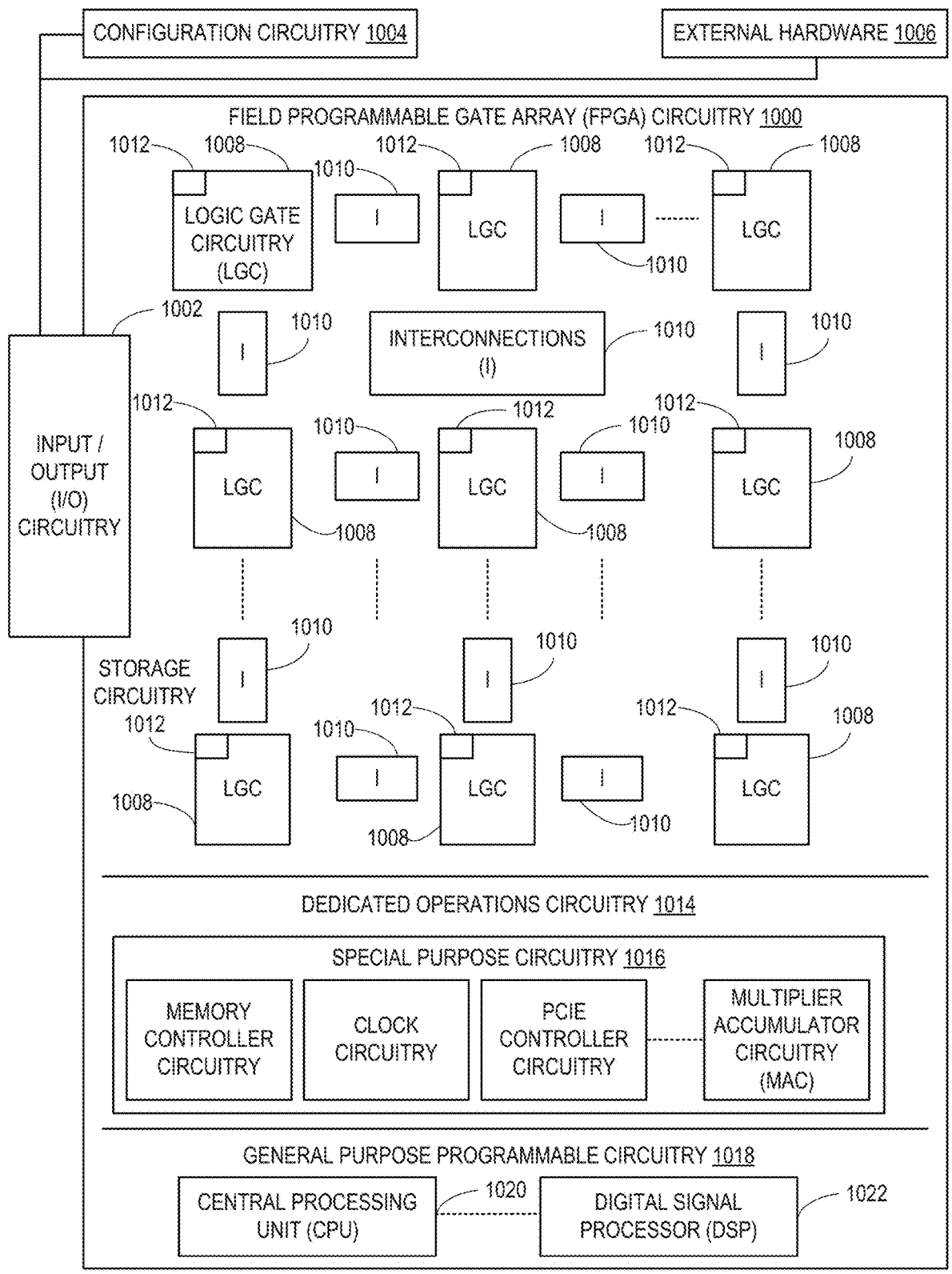
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4 and 5 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 4 and 5. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4 and 5. As such, the FPGA circuitry 1000 may be structured to effectively instantiate some or all of the machine readable instructions of the flowchart of FIGS. 4 and 5 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 4 and 5 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 4 and 5 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4 and 5 may be executed by one or more of the cores 902 of FIG. 9 and a second portion of the machine readable instructions represented by the flowchart of FIGS. 4 and 5 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
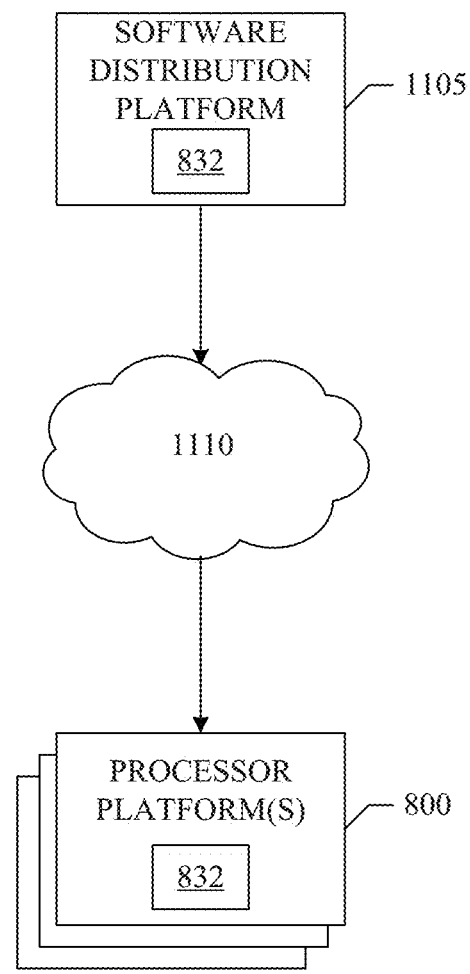
FIG. 11 is a block diagram of an example software distribution platform (e.g., one or more servers) to distribute software (e.g., software corresponding to the example machine readable instructions of FIGS. 4 and 5 to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example machine readable instructions 400, 500 of FIGS. 4 and 5, as described above. The one or more servers of the example software distribution platform 1105 are in communication with a network 1110, which may correspond to any one or more of the Internet and/or any of the example network 108 described above. In some examples, the one or more servers are responsive to requests to transmit the software to a requesting party as part of a commercial transaction. Payment for the delivery, sale and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 400, 500 of FIGS. 4 and 5, may be downloaded to the example processor platform 800, which is to execute the machine readable instructions 832 to implement the browsing analysis system 300. In some example, one or more servers of the software distribution platform 805 periodically offer, transmit, and/or force updates to the software (e.g., the example machine readable instructions 832 of FIG. 8) to ensure improvements, patches, updates, etc. are distributed and applied to the software at the end user devices, such as the media devices 104, for example.

Further examples and combinations thereof include the following:

Example 1 includes an apparatus comprising processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate pattern generator circuitry to determine patterns of uniform resource identifiers (URIs) associated with corresponding main pages, traffic analyzer circuitry to parse data from network traffic, and pattern identifier circuitry to identify at least one of the main pages from the data based on the patterns, and provide the identified at least one of the main pages for crediting thereof.

Example 2 includes the apparatus as defined in example 1, wherein the pattern identifier circuitry is to identify the patterns based on numbers of occurrences of the URIs.

Example 3 includes the apparatus as defined in example 2, wherein the occurrences are associated with corresponding GET URI functions.

Example 4 includes the apparatus as defined in any of examples 1 to 3, wherein the pattern generator circuitry is to discard URIs identified in the network traffic from a storage in response to identification of the one of the main pages.

Example 5 includes the apparatus as defined in any of examples 1 to 4, wherein the traffic analyzer circuitry is to parse data packets from the network traffic via a virtual private network (VPN).

Example 6 includes the apparatus as defined in any of examples 1 to 4, wherein the pattern identifier circuitry is to request additional trained data from the pattern generator when the main page cannot be identified.

Example 7 includes the apparatus as defined in any of examples 1 to 6, wherein the identification of the at least one of the main pages is based on a sum of a ratio of attempts of requested URIs with a total number of occurrences of the requested URIs to the attempts of the requested URIs.

Example 8 includes the apparatus as defined in any of examples 1 to 7, wherein the pattern generator circuitry is implemented on a server and the pattern identifier is implemented on a media device.

Example 9 includes a non-transitory computer readable medium comprising instructions which, when executed, cause at least one processor to determine patterns of uniform resource identifiers (URIs) with corresponding main pages, parse data from network traffic, identify at least one of the main pages from the data based on the patterns, and provide the identified at least one of the main pages for crediting thereof.

Example 10 includes the non-transitory computer readable medium as defined in example 9, wherein the patterns are determined based on numbers of occurrences of the URIs.

Example 11 includes the non-transitory computer readable medium as defined in example 10, wherein the occurrences are associated with corresponding GET URI functions.

Example 12 includes the non-transitory computer readable medium as defined in any of examples 9 to 11, wherein the instructions further cause the at least one processor to discard URIs identified in the network traffic from storage in response to the identification of the at least one of the main pages.

Example 13 includes the non-transitory computer readable medium as defined in any of examples 9 to 12, wherein the instructions further cause the at least one processor to parse data packets from the network traffic via a virtual private network (VPN).

Example 14 includes the non-transitory computer readable medium as defined in any of examples 9 to 13, wherein the instructions further cause the at least one processor to request additional trained data when the main page cannot be identified.

Example 15 includes the non-transitory computer readable medium as defined in any of examples 9 to 14, wherein the identification of the at least one of the main pages is based on a sum of a ratio of attempts of requested URIs with a total number of occurrences of the requested URIs to the attempts of the requested URIs.

Example 16 includes the non-transitory computer readable medium as defined in any of examples 9 to 15, wherein the pattern is determined based on a list of the URIs.

Example 17 includes a method comprising determining, by executing instructions with at least one processor, patterns of uniform resource identifiers (URIs) with corresponding main pages, parsing, by executing instructions with the at least one processor, data from network traffic, identifying, by executing instructions with the at least one processor, at least one of the main pages from the data based on the patterns, and providing, by executing instructions with the at least one processor, the identified at least one of the main pages for crediting thereof.

Example 18 includes the method as defined in example 17, wherein the determining of the patterns is based on numbers of occurrences of the URIs.

Example 19 includes the method of example 18, wherein the occurrences are associated with corresponding GET URI functions.

Example 20 includes the method as defined in any of examples 17 to 19, further including discarding by executing instructions with the at least one processor, URIs identified from the network traffic in response to the identifying of the at least one of the main pages.

Example 21 includes the method as defined in any of examples 17 to 20, wherein the parsing of the data from the network traffic occurs via a virtual private network (VPN) and includes parsing data packets of the network traffic.

Example 22 includes the method as defined in any of examples 17 to 21, further including requesting additional trained data when the main page cannot be identified.

Example 23 includes the method as defined in any of examples 17 to 22, wherein the identifying of the one of the main pages is based on a sum of a ratio of attempts of requested URIs with a total number of occurrences of the requested URIs to the attempts of the requested URIs.

Example 24 includes the method as defined in any of examples 17 to 23, wherein the determining of the pattern is based on a list of the URIs.

Example 25 includes an apparatus comprising at least one memory, instructions in the apparatus, and processor circuitry including control circuitry to control data movement within the processor circuitry, arithmetic and logic circuitry to perform one or more operations on the data, and one or more registers to store a result of one or more of the operations, the processor circuitry to execute the instructions to determine patterns of uniform resource identifiers (URIs) associated with corresponding main pages, parse data from network traffic, and identify at least one of the main pages from the data based on the patterns.

Example 26 includes the apparatus as defined in example 25, wherein the processor circuitry is to identify the patterns based on numbers of occurrences of the URIs.

Example 27 includes the apparatus as defined in example 26, wherein the occurrences are associated with corresponding GET URI functions.

Example 28 includes the apparatus as defined in example 25, wherein the processor circuitry is to discard URIs identified in the network traffic from a storage in response to identification of the one of the main pages.

Example 29 includes the apparatus as defined in example 25, wherein the processor circuitry is to parse data packets from the network traffic via a virtual private network (VPN).

Example 30 includes the apparatus as defined in example 25, wherein the processor circuitry is to request additional trained data from the pattern generator when the main page cannot be identified.

Example 31 includes the apparatus as defined in example 25, wherein the identification of the at least one of the main pages is based on a sum of a ratio of attempts of requested URIs with a total number of occurrences of the requested URIs to the attempts of the requested URIs.

From the foregoing, it will be appreciated that example methods, apparatus and articles of manufacture have been disclosed that enable accurate determination of main pages and/or main pages from extracted URIs. Examples disclosed herein also enable space efficient storage of data. The disclosed systems, methods, apparatus, and articles of manufacture improve the efficiency of using a computing device by enabling a reduced data set that can be much more computationally efficient to analyze, store and/or distribute. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An audience measurement computing system comprising:
   a media device; and
   one or more comprising a first network interface and configured to:
      access main pages via the first network interface;
      collect, via the first network interface, first network traffic data associated with the access to the main pages;
      based on the collected first network data, identify, for each accessed main page, a pattern of requested uniform resource identifiers (URIs) corresponding to response times of the requested URIs:
      generate training data comprising the patterns; and
      transmit the training data to the media device via the first network interface, wherein the media device comprises a second network interface and is configured to:
      collect, via the second network interface, second network traffic data associated with access to at least one of the main pages;
      identify a set of URIs from the second network traffic data; and
      detect the at least one of the main pages based on a comparison of the set of URIs with the patterns of the training received from the one or more servers.

2. The audience measurement computing system of claim 1, wherein the one or more servers are configured to identify the pattern based on numbers of occurrences of the requested URIs.

3. The audience measurement computing system of claim 2, wherein the occurrences are associated with corresponding GET URI functions.

4. The audience measurement computing system of claim 1, wherein the media device is further configured to discard the set of URIs identified in the second network traffic data from a storage based on a detection of the at least one of the main pages.

5. The audience measurement computing system of claim 1, wherein collecting the second network traffic data via the second network interface comprises receiving the second network traffic data via the second network interface from a virtual private network (VPN), wherein the VPN is configured to record the second network traffic data.

6. The audience measurement computing system of claim 1, wherein the media device is further configured to request additional training data when the at least one of the main pages cannot be detected.

7. The audience measurement computing system of claim 1, wherein detecting the at least one of the main pages comprises detecting the at least one of the main pages based on a ratio of a sum of attempts of the set of URIs to a total number of occurrences of the set of URIs.

8. The audience measurement computing system of claim 1, wherein detecting the at least one of the main pages comprises detecting the at least one of the main pages based on an order of responses of the set of URIs.

9. A non-transitory computer readable medium comprising instructions that, when executed, cause an audience measurement computing system to perform operations comprising:
   accessing, by one or more servers and via a first network interface of the one or more servers, main pages:
   collecting, by the one or more servers and via the first network interface, first network traffic data associated with the access to the main pages;
   based on the collected first network traffic data, identifying by the one or more servers, for each accessed main page, a pattern requested uniform resource identifiers (URIs) corresponding to response times of the requested URIs;
   generating, by the one or more servers, training data comprising the patterns;
   transmitting, by the one or more servers, the training data to a media device via the first network interface;
   collecting, by the media device via a second network interface of the media device, second network traffic data associated with access to at least one of the main pages;
   identifying, by th media device, a set of URIs from the second network traffic data; and
   detecting, by the media device, the at least one of the main pages based on a comparison of the set of URIs with the patterns of the training dat received from the one or more servers.

10. The non-transitory computer readable medium of claim 9, wherein
   identifying the pattern comprises identifying the pattern based on numbers of occurrences of the requested URIs.

11. The non-transitory computer readable medium a of claim 10, wherein the occurrences are associated with corresponding GET URI functions.

12. The non-transitory computer readable medium of claim 9, the operations further comprising
   discarding, by the media device, the set of URIs identified in the second network traffic data from a storage based on a detection of the at least one of the main pages.

13. The non-transitory computer readable medium of claim 9, wherein collecting the second network traffic data via the second network interface comprises receiving the second network traffic data via the second network interface from a virtual private network (VPN), wherein the VPN is configured to record the second network traffic data.

14. The non-transitory computer readable medium of claim 9, the operations further comprising:
   requesting, by the media device, additional training data when the at least one of the main pages cannot be identified.

15. The non-transitory computer readable medium of claim 9, wherein detecting the at least one of the main pages comprises detecting the at least one of the main pages based on a ratio of a sum of attempts of the set of URIs with to a total number of occurrences of the set of URIs.

16. The non-transitory computer readable medium of claim 9, wherein detecting the at least one of the main pages comprises detecting the at least one of the main pages based on an order of responses of the set of URIs.

17. The non-transitory computer readable medium of claim 9, wherein identifying the patterns comprises identifying the patterns using a machine learning model.

18. A method performed by an audience measurement computing system comprising one or more servers and a media device, the method comprising:
   accessing, by the one more servers and via a first network interface of the one or more servers, main pages:
   collecting, by the one or more servers and via the first network interface, first network traffic data associated with the access to the main pages;
   based on the collected first network traffic data, identifying, by the one or more servers, for each accessed main page, a pattern of requested uniform resource identifiers (URIs) corresponding to response times of the requested URIs:
   generating, by the one or more servers, training data comprising the patterns;
   transmitting, by the one or more servers, the training data to the media device via the first network interface;
   collecting, by the media device via a second network interface of the media device, second network traffic data associated with access to at least one of the main pages;
   identifying, by the media device, a set of URIs from the second network traffic data; and
   detecting, by the media device, the at least one of the main pages based on a comparison of the set of URIs with the patterns of the training data received from the one or more servers.

19. The method of claim 18, wherein identifying the pattern comprises identifying the pattern based on numbers of occurrences of the requested URIs.

20. The method of claim 19, wherein the occurrences are associated with corresponding GET URI functions.

21. The method of claim 18, further comprising:
   discarding, by the media device, the set of URIs identified in the second network traffic data from a storage based on a detection of the at least one of the main pages.

22. The method of claim 18, wherein collecting the second network traffic data via the second network interface comprises receiving the second network traffic data via the second network interface from a virtual private network (VPN), wherein the VPN is configured to record the second network traffic data.

23. The method of claim 18, further comprising:
   requesting, by the media device, additional training data when the at least one of the main pages cannot be identified.

24. The method of claim 18, wherein detecting the at least one of the main pages comprises detecting the at least one of the main pages based on a ratio of a sum of attempts of set of URIs to a total number of occurrences of the set of URIs.

25. The method of claim 18, wherein detecting the at least one of the main pages comprises detecting the at least one of the main pages based on an order of responses of the set of URIs.

* * * * *